May 2, 1967 W. W. MELVIN 3,316,887
ROTARY ENGINE

Filed May 24, 1965 5 Sheets-Sheet 1

INVENTOR
WILLIAM W. MELVIN

BY Robert G. McMorrow
ATTORNEY

May 2, 1967 W. W. MELVIN 3,316,887
ROTARY ENGINE

Filed May 24, 1965 5 Sheets-Sheet 2

INVENTOR
WILLIAM W. MELVIN

BY Robert G. McMorrow
ATTORNEY

May 2, 1967

W. W. MELVIN 3,316,887

ROTARY ENGINE

Filed May 24, 1965

INVENTOR
WILLIAM W. MELVIN

BY Robert G. McMorrow
ATTORNEY

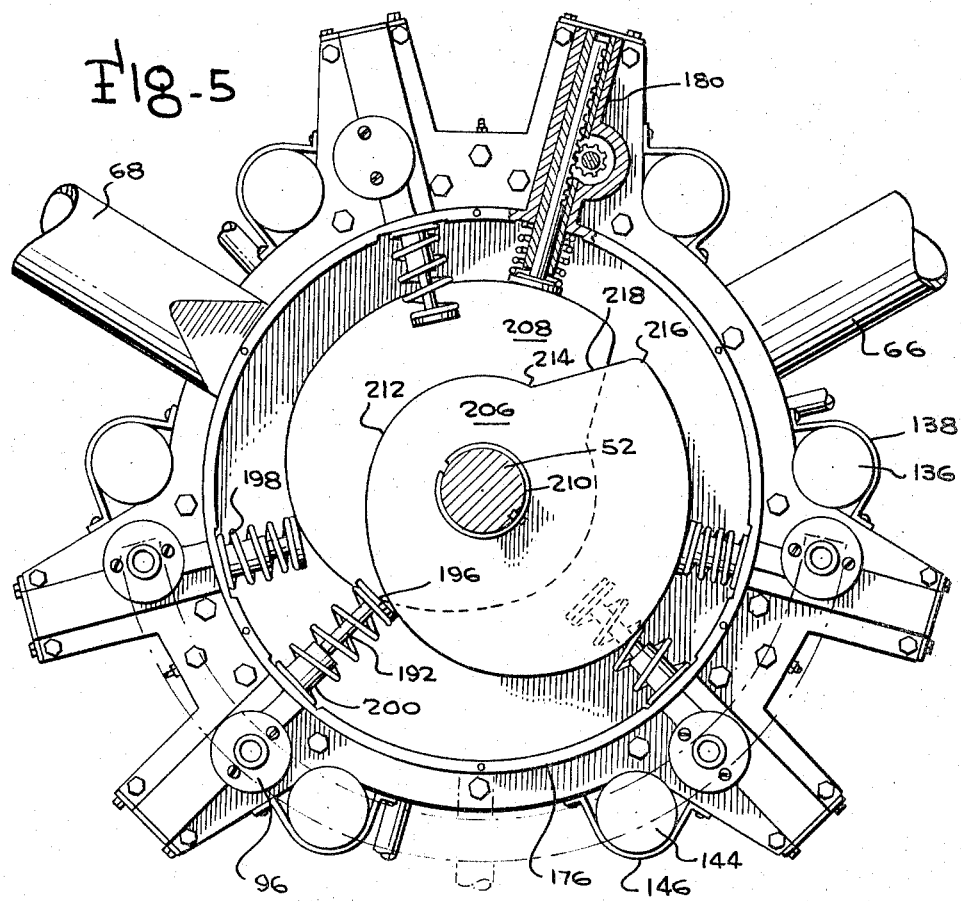
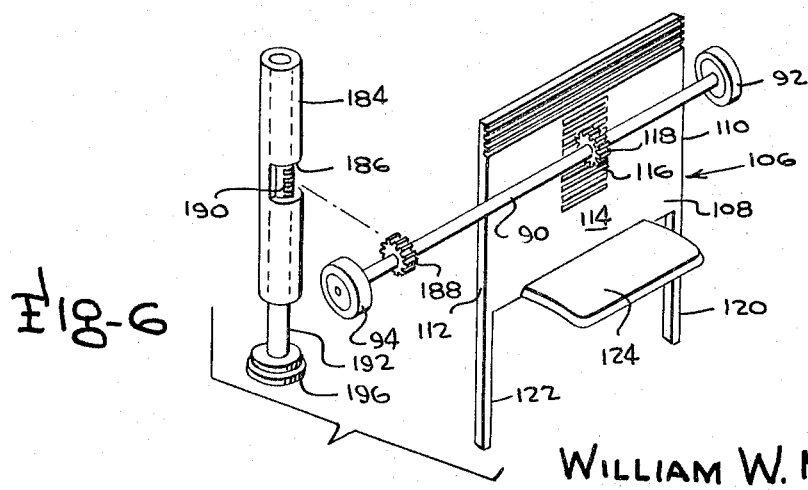

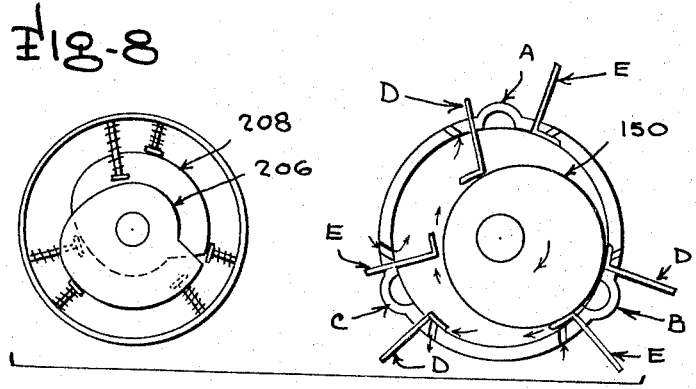
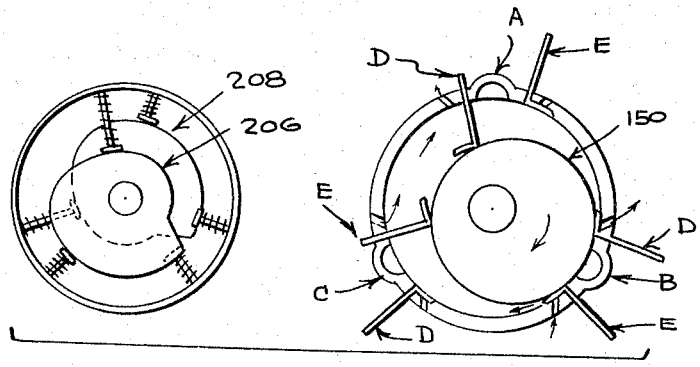
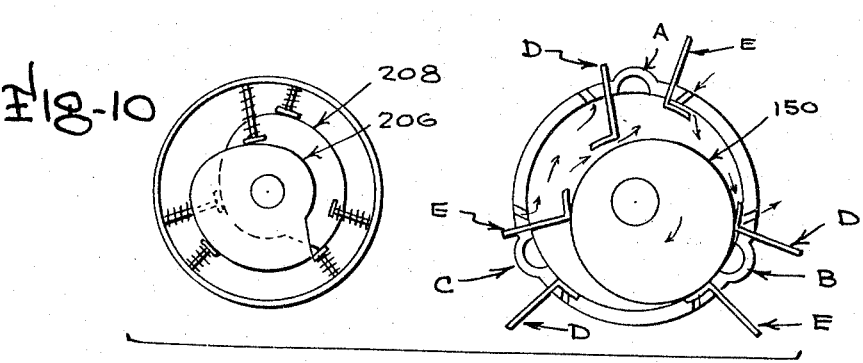
INVENTOR
WILLIAM W. MELVIN
BY Robert G. McMorrow
ATTORNEY United States Patent Office 3,316,887
Patented May 2, 1967

3,316,887
ROTARY ENGINE
William M. Melvin, 8434 Greenstone Drive,
Dallas, Tex. 75231
Filed May 24, 1965, Ser. No. 458,201
13 Claims. (Cl. 123—14)

This invention pertains to internal combustion engines of the rotary type.

A basic objective of the present invention is to provide a rotary internal combustion engine of increased efficiency embodying a multiple function chamber concept which reduces engine wear, decreases the overall displacement of the engine with respect to the number of combustion areas thereof, and greatly increases the power to weight ratio thereof.

Recent developments in the field of internal combustion engines have evidenced increased interest in various rotary designs, and the prior art is replete with rotary mechanisms involving circular housings and cylinder means operatively arranged within the housings for the application of rotary force to a shaft upon energization. These prior art assemblies have found but limited acceptance, and test problems have continually arisen with respect to frictional loss of energy and wear, particularly at sealing locations. It is proposed by the present invention to overcome these problems by the adaptation of a new and novel rotor with co-active control means for the elements functioning to seal the rotor in its cycle of operation.

Another objective of importance resides in the provision of a rotary internal combustion engine construction involving a housing with an annular side wall, and an eccentrically mounted rotor in the housing disposed in rolling contact with the housing side wall. Equally significant in the present concept is the provision of a rotary engine construction wherein intake, compression, expansion and exhaust functions occur in a single enclosed chamber. The related object involves the supplying of an engine with a cylinder wall and an element movable with respect to the wall wherein the movable element contacts the wall at only one point, thus eliminating wear at multiple contact points.

A further object of importance is to relate the control of the engine sealing means directly to the cycling of operation of the rotor. To this end, the invention comprehends inclusion of cam actuated lift means for the valve sealing of the rotor, the cam being connected on the axis of rotation of the rotor for movement therewith.

An additional object is to provide an engine construction particularly adapted for the employment of fuel injection and supercharging, and one having effective cooling and lubrication means.

Other and further objects and advantages of this invention will become apparent to those skilled in the art from a consideration of the following specification when read in conjunction with the annexed drawings, in which:

FIGURE 5 is a sectional view on line 5—5 of FIGURE 2, showing the control means hereof;

FIGURE 6 is a disassembled perspective view of elements of the control apparatus; and FIGURES 7 through 10 are diagrammatic views disclosing relative positions of the elements in variant operational phases.

Figure 1:
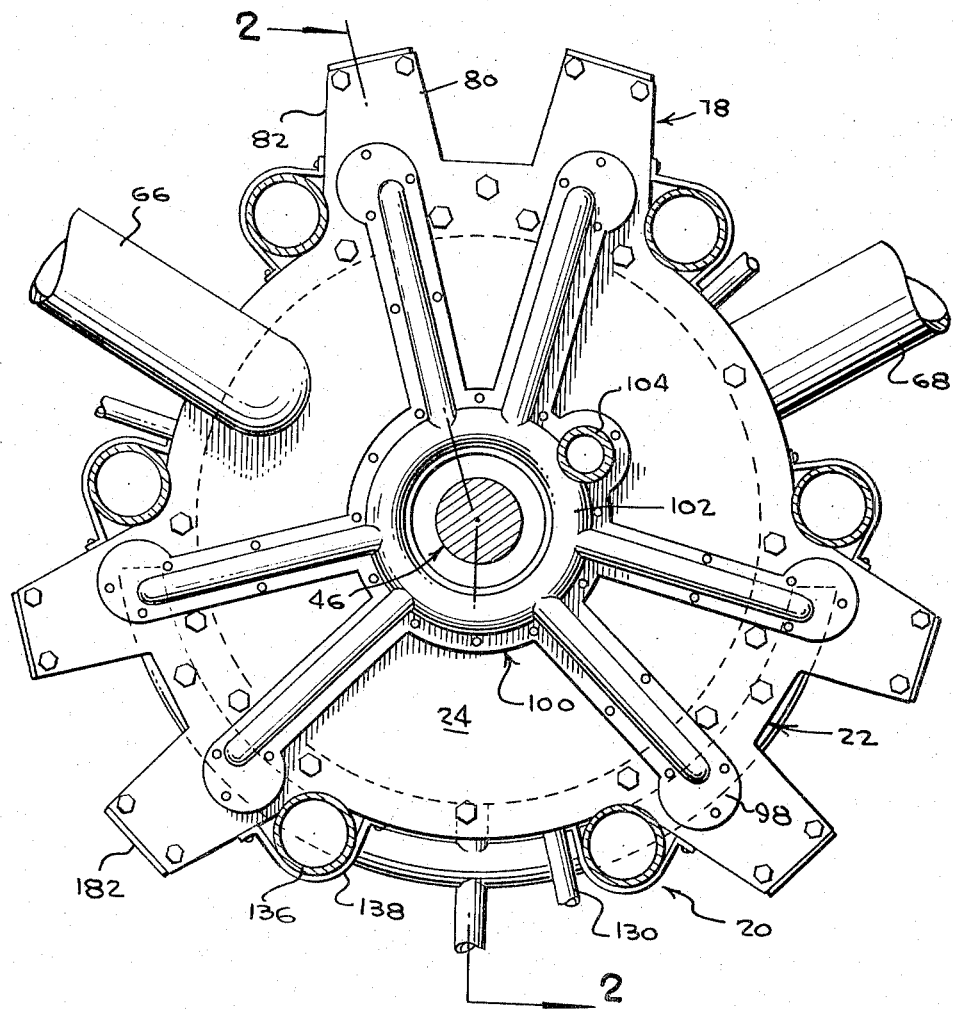
FIGURE 1 is an end elevational view of an engine constructed and assembled in accordance with the teachings of this invention.

Proceeding to a more detailed description of the invention, and initially to the construction of a preferred embodiment thereof, the engine is per se designated throughout the several views by reference numeral 20. The basic component of the engine 20 is its housing 22. The housing 22 comprises an outer end wall 24 of double wall construction having inner and outer elements 26, 28 separated by a coolant chamber 30, and having a substantially centrally located opening 32 therethrough. The housing further includes an opposite inner end wall 34 with dual elements 36, 38 and a coolant chamber 40, having an opening 42 therein coaxial with the opening 32. Bearing assemblies 44 are engaged in the openings 42 and 32 and support an elongated, substantially cylindrical main shaft 46.

The shaft 46 has an enlarged central section 48 engaged between the bearings 44, and has ends 50 and 52 extended outwardly thereof.

Figure 2:
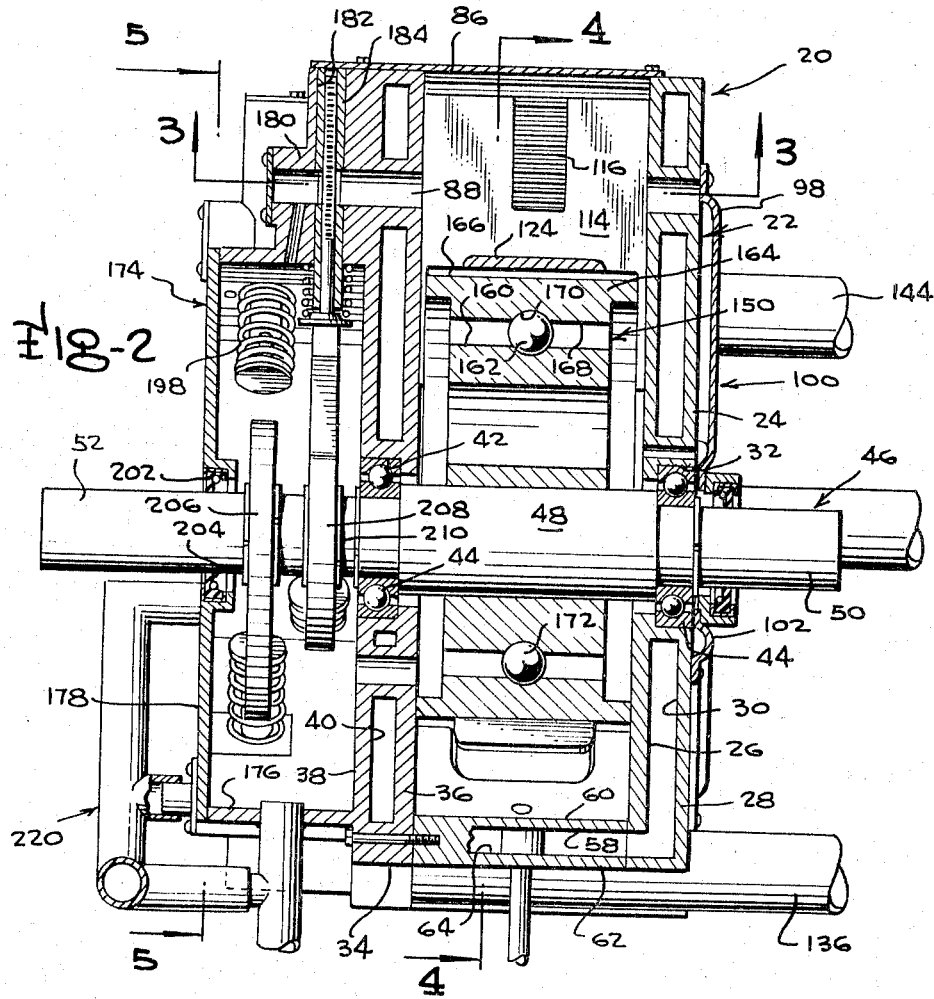
FIGURE 2 is a vertical cross-sectional view, taken substantially on the section line 2—2 of FIGURE 1, looking in the direction of the arrows.
Figure 4:
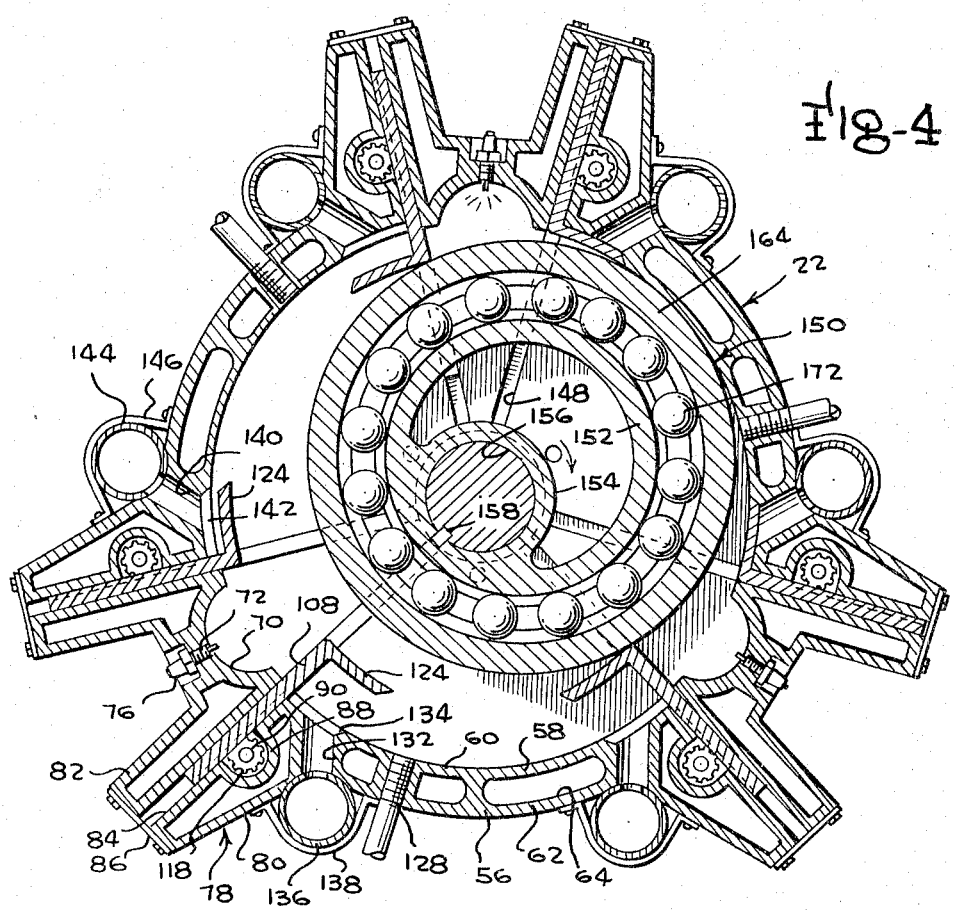
FIGURE 4 is a sectional view through the engine hereof, on line 4—4 of FIGURE 2 looking in the direction of the arrows.

An annular side wall 56, best illustrated in FIGURE 4, connects the end walls, and has an interior element 58 with an inner surface 60, and outer element 62. Coolant chambers 64 are provided between elements 58 and 62, and communicate with the side wall chambers as illustrated in FIGURE 2. FIGURES 1 and 5 show the coolant supply conduit 66 and return conduit 68 which, respectively, supply coolant fluid to the engine and convey the heated fluid away from the engine for suitable cooling and recirculation. Any means for cooling the fluid may be utilized, the cooling means forming no part of the present invention.

Figure 3:
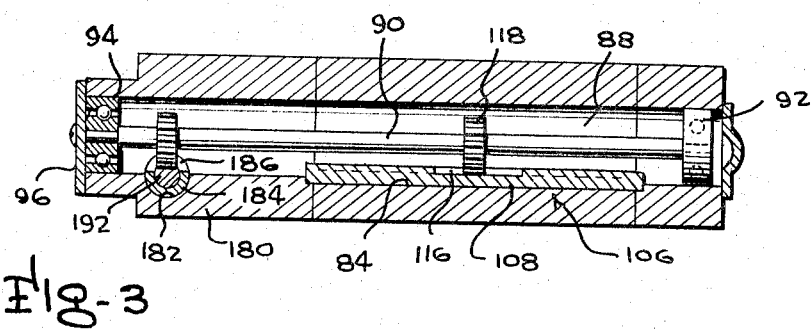
FIGURE 3 is an enlarged, detail cross-section on the line 3—3 of FIGURE 2, looking in the direction of the arrows.

Referring to FIGURE 4, wherein the construction of the side wall 56 is further shown, it will be noted that a plurality of domed ignition areas 70 are provided at spaced locations thereabout. In the illustrated embodiment, three such areas are shown, but it should be understood that any selected number of such areas may be provided within dimensional limitations of particular engines. The wall has an aperture 72 therein at substantially the apex of each domed area, in which is seated a spark plug 76 or other suitable ignition means. The ignition means is connected to a suitable power source with a control for firing thereof at selected intervals. Located on each side of each domed area 70 are separation valve housings 78 with dual side walls 80 and 82 and having a trackway 84 therebetween extending into the engine housing 22. The respective valve housings have a cover plate 86 thereon extending across the housing 78 and end wall 34 as shown in FIGURE 2. The inner sections of the valve housing side walls 80 have inward extended portions 88 forming a pinion retention slot. With reference to FIGURE 3, as shown therein, the extended portion 88 extends into the housing side walls, and an elongated shaft 90 is mounted therein on bearings 92, 94 disposed adjacent the ends thereof. Removable cover plates 96 are mounted on the wall 34 to seal one end of the slot, while the opposite ends are covered by extended arms 98 of a lubrication cover assembly 100 affixed to the wall 24. The assembly 100 includes an annular central section 102 about the shaft end 50, and receives lubricant fluid from a supply conduit 104 leading to a supply pump, not shown.

Mounted in each trackway 84 for reciprocal movement therein is a separation valve 106 best shown in FIGURE 6. The valves 106 comprise substantially flat plate sections 108 having side edges 110, 112 and forward faces 114. The faces 114 have rack gear teeth 116 therein in mesh with a pinion 118 on the shaft 90. The plates have depending side legs 120, 122 forming prolongations of the side edges, and have arcuate contact elements 124 fixed to their inner sides. The valves 106 are oppositely disposed on the sides of each domed area 70, such that the contact elements of each pair are extended in opposite directions. The curvature of the contact elements is substantially equivalent to that of the interior surface 60 of the end wall, for a purpose appearing below. As will also appear below, the pairs of valves each include an expansion separation valve and a compression separation valve located, respectively, immediately in advance of and to the rear of the domed areas as the engine appears in FIGURE 7 assuming clockwise viewing of the housing.

At spaced locations about the side wall 56, adjacent each area 70 and in advance thereof moving clockwise as the engine is shown in FIGURE 4, the wall has openings 128 therein. Fuel input conduits 130 are connected in each opening 128, for direct injection of a combustible fluid such as gasoline into the engine. At locations between the openings 128 and the areas 70, the wall 56 has an exhaust passage 132 therein for the discharge of products of combustion. Each such passageway has an adjacent valve seat 134 shaped to receive the contact element 124 of the adjacent expansion separation valve, whereby the contact element is adapted for positioning therein flush with the surface 60. An exhaust pipe 136 is secured by a bracket 138 to the housing in communication with the passageway 132. The pipes 136 extend to a suitable discharge manifold or system (not shown).

On the opposite side of each area 70 a second inclined passageway 140 is formed in the wall 56, comprising an air inlet passageway. The second passageway has a seat 142 for the reception of the contact element 124 of the adjacent compression separation valve. An inlet pipe 144, held in place by a strap type bracket 146, is positioned in communication with the passageway 140 and pipes 144 lead to a common source of air for forcing into the engine upon inward displacement of the contact member 124 from the seat 142.

As best shown in FIGURE 4, the inner elements 26 and 36 of the end walls of the housing have inward slots 148 therein extending radially from the central openings thereof providing a guide means for the side edges 110, 112 and legs 120, 122 of the plate 114 and being aligned with the trackways 84.

Mounted on the enlarged central section 48 of the shaft 46 is a substantially cylindrical chamber separation roller assembly 150. The assembly 150, comprising the rotor hereof, includes an inner element 152 with an eccentric shaft mount 154 having an opening 156 therein. In FIGURE 4, it is seen that the shaft section 48 extends through the opening 156 and that a key 158 is employed to lock the element 152 to the shaft for rotation therewith. The inner element 152 has an outer face 160 with a race slot 162 therein. The assembly 150 further comprises an outer roller 164 of annular form having an outer surface 166 and an inner surface 168. The inner surface has a race slot 170 therein. Bearings 172 are engaged between the slots 162, 170 whereby the outer roller is rotatable about the inner element 152. With continued reference to FIGURE 4, and in FIGURES 7 through 10, it is seen that the outer surface 160 of the outer roller 164 contacts the inner surface 60 of the side wall 56 tangentially as it moves thereabout in a manner described below. The rotational movement of the roller assembly transmits equivalent rotary force to the shaft 46.

A control assembly 174 is affixed to the inner end wall 34 of the engine housing. The control assembly includes an annular outer wall 176 and a side member 178. The wall 176 is preferably integral with the inner wall 34 of the engine housing and has extensions 180 comprising prolongations of the control housings 78. Each of said extensions has a radially extending bore 182 formed therein intersecting the slot 88. A sleeve 184 is engaged in each of the bores, the sleeve having a window 186. A second pinion 188 is carried on the rod 90 and extends through the window 186 to mesh with gear teeth 190 on the valve lift pins 192 mounted for reciprocation in the sleeve. The pins have enlarged abutment elements 196 at their inner ends. As shown in FIGURES 2 and 5, the pins 192 are arranged in two circular rows, one of which controls the air inlet valves and the other controlling the exhaust valves. Each pin is constantly biased inwardly by a coil spring 198 mounted between the abutment element 196 and a retention collar 200.

The side member 178 has a substantially central opening 202 therein provided with a suitable oil seal 204, and the end 52 of the shaft 46 extends therethrough. A pair of cam members 206 and 208 are mounted on the shaft within the control housing, between the side 178 and the wall 34. The cams are retained in place by split rings 210, or otherwise. The cams are eccentrically mounted and of irregular configuration, each including an outer cam surface 212 which is of increasing distance from the center of the shaft 46 from a starting point 214 to a drop off point 216. The starting and drop off points are joined by a slant connecting wall 218. As will be noted in FIGURE 5, cam members 206 and 208 are oppositely mounted on the shaft, with the slant walls 218 in crossed relationship and the points 216 closely adjacent one another. The arrangement of the cam members is such that each contacts abutment elements 196 of the rows thereof for raising and lowering of the separation valve means at controlled intervals as hereinafter described. A suitable oil return manifold 220 collects oil from the engine and sends it through the reservoir and pump mentioned above.

Figure 7:
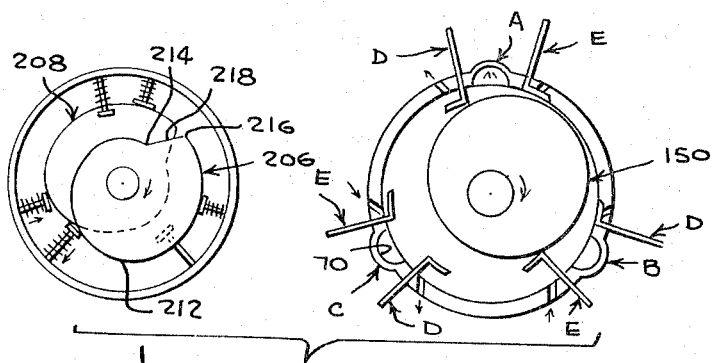

In the illustrated embodiment of the invention, the structure of which is described above, three combustion chambers (denoted A, B and C) are shown, each having an expansion separation valve D, and compression separation valve E. Referring to FIGURE 7, the rotor 150 is therein being driven in clockwise direction by the expansion of combustion occurring in chamber A. This movement of the roller is contemporaneously creating an explosive charge in chamber B through compression of the fuel-air mixture therein adjacent the separation compression valve E thereof—the expansion valve D being in retracted position. In this phase of operation, chamber C is in a transitional position, wherein the valves are disposed in intermediate locations.

Proceeding to FIGURE 8, the rotor 150 is continuing its clockwise rotation, and its center line is at substantially the center line of valve D of chamber B, and it is at this stage that the valve D is released from its cam and begins to ride down the rotor. Ignition occurs in chamber B at some time before the rotor is at the center thereof, and chamber C is in the process of being charged with fuel and air. Chamber A remains under pressurization as no valves have as yet begun to open at this stage.

FIGURE 9 illustrates the rotor rotated with its center line at substantially the center of chamber B—the valve D of that chamber being slightly opened and the product of combustion from chamber A being released. Scavenging of chamber A commences at substantially this point inasmuch as the valve D of chamber A is being lifted and the valve E of chamber A is being lowered. Timing need not be exact, but it is necessary that the raising of valve D of chamber A must come some time after the valve D of chamber B begins to be lowered so that gas under pressure is exhausted from that chamber before the lower pressure incoming air can be employed for scavenging. For the same reason, valve E of chamber A can not be lowered until after valve D of chamber B is lowered. In chamber C, valve E is fully lowered and valve D is fully raised. However, compression in chamber C is not quite beginning because the valve E in chamber B is slightly open and some air charge can escape.

Finally, in FIGURE 10, when the rotor is at the center of the valve E of chamber B, full compression of the air charge in chamber C begins. Following this point, the fuel is injected into the chamber C, and the valve E of chamber B has been pushed all the way up by the rotor and its cam is just beginning to hold it up for the expansion process in chamber B. The relative positions of the cams 206 and 208 during the rotation of rotor 150 are shown in each of FIGURES 7 through 10. The inward and outward movement of each valve is directly controlled by the rotation of the rotor and shaft, thus insuring constant synchronization of the valve positions with respect to firing of the engine chambers.

As will occur to those skilled in the art, any number of chambers may be employed with modification of the cams and the provision of valve D and E for each.

Having thus described and illustrated an embodiment of this invention in some detail, it will be understood that this description and illustration is offered only by way of example, and the invention is to be limited in scope only by the appended claims.

What is claimed is:

1. A rotary internal combustion engine comprising:
   an engine housing;
   a shaft extending through the housing;
   a roller mounted on the shaft for rotation in the housing;
   at least one combustion chamber area in the housing having ignition means associated therewith;
   valve means on each side of the ignition means; and
   control means connected to the shaft for opening and closing the valves.

2. A rotary internal combustion engine comprising:
   an engine housing including an annular side wall;
   a shaft extending through the housing;
   a roller carried on the shaft eccentrically and in rolling contact with the side wall;
   at least one combustion chamber area in the housing having ignition means associated therewith;
   valve means on each side of the ignition means; and
   control means connected to the shaft for opening and closing the valves.

3. A rotary internal combustion engine comprising:
   an engine housing including an annular side wall;
   a shaft extending through the housing;
   a rotor carried on the shaft eccentrically and in rolling contact with the side wall;
   a plurality of combustion chamber areas in the housing each having ignition means associated therewith;
   valve means on each side of each of the ignition means; and
   control means connected to the shaft for opening and closing the valves.

4. A rotary internal combustion engine as defined in claim 3, wherein:
   the control means includes rotatable cam members.

5. A rotary internal combustion engine as defined in claim 4, and:
   a control housing for said cam member.

6. A rotary internal combustion engine as defined in claim 5, and:
   a geared linkage extending between the cam members and the valves.

7. A rotary internal combustion engine as defined in claim 6, wherein:
   the valves comprise plates with arcuate contact members shaped to conform to side wall in a retracted position thereof.

8. A rotary internal combustion engine comprising:
   an engine housing having end walls and an annular side wall;
   a shaft rotatably mounted in the end walls and extending outwardly thereof;
   the side wall having a plurality of domed combustion areas spaced thereabout;
   ignition means in each of said areas;
   fuel supply means for each combustion area;
   side wall having an exhaust and an air inlet pasasgeway formed therein on opposite sides of each combustion area;
   an expansion separation valve for each exhaust passageway and a compression separation valve for each air inlet passageway, the valves being mounted for radial inward and outward movement; and
   control means for the valves.

9. A rotary internal combustion engine as defined in claim 8, wherein:
   each valve comprises a plate extending between the end walls.

10. A rotary internal combustion engine as defined in claim 9, wherein:
    the control means comprises a control housing secured to one end wall of the engine housing;
    a shaft extending through the control housing;
    cams mounted on the shaft for rotation therewith in the control housing; and
    linkage means connecting the plates and cams.

11. A rotary internal combustion engine as defined in claim 10, and:
    lubrication means for the engine including an oil supply manifold connected to the control housing.

12. A rotary internal combustion engine as defined in claim 10, wherein:
    the linkage means comprises a control shaft having a pair of gears thereon;
    rack gear teeth on the plates meshed with one of the gears of said control shaft;
    a sleeve with a lift pin therein;
    the lift pin having gear teeth meshed with the other said gears of said control shaft; and
    the lift pin having contact members thereon abuted by the cam members.

13. A rotary internal combustion engine comprising:
    an engine housing having an outer end wall and an opposite inner end wall, the end walls having substantially centrally located, coaxial openings therein;
    an annular side wall connecting the end walls;
    the end walls and side wall having communicating coolant chambers therein;
    a main shaft extending through the housing and projecting through the openings of the end walls;
    a plurality of fuel input conduits connected to the side wall at spaced locations;
    the side wall having inlet passageways and exhaust passageways formed therein in pairs spaced thereabout;
    a substantially cylindrical chamber separation roller mounted eccentrically on the main shaft for rotation between the end walls in changeable, tangential contact with the side wall;
    the roller including an inner element fixed to the main shaft and an outer element rotatably mounted about the inner element;
    separation valve housings mounted on the side wall at spaced locations, each housing having a trackway therein;
    exhaust and compression valves, each comprising a plate with gear teeth thereon extending into the respective trackways, and a curved foot member contacted by the roller and operable in one position to close the respective inlet and exhaust ports;
    ignition means at spaced locations about the side wall;
    a control housing secured to the inner side wall of the engine housing and having an annular side wall and an end wall, the main shaft extending through the last-named end wall;

a control for each of the separation valves mounted in the control housing and having spring means to constantly bias it toward an outer position.

a pair of eccentrically mounted cam means mounted for rotation with the shaft within the control housing and being arranged for the sequential opening and closing of the controls and the valves associated therewith;

a transverse valve control shaft extended between the controls, and the separation valves, the shaft having gears thereon engaging the gear teeth of the separation valves and the controls, whereby control movement is imparted to the respective separation valves; and lubrication inlet means for the control housing.

References Cited by the Examiner

UNITED STATES PATENTS

| | | | |
|---|---|---|---|
| 880,453 | 2/1908 | Hokanson | 123—14 |
| 1,174,632 | 3/1916 | Snyder | 123—14 |
| 1,305,451 | 6/1919 | Evans | 123—14 |
| 1,349,111 | 8/1920 | Suarez | 123—14 |
| 1,434,446 | 11/1922 | McQueen | 123—14 |
| 1,871,462 | 8/1932 | Morse | 123—14 |
| 1,944,956 | 1/1934 | Thomas | 123—14 |
| 2,170,366 | 8/1939 | Dominguez | 123—14 |
| 2,237,591 | 4/1941 | Dumarest | 123—14 |

DONLEY J. STOCKING, *Primary Examiner.*

W. J. GOODLIN, *Assistant Examiner.*